(12) United States Patent
Smith et al.

(10) Patent No.: US 7,144,558 B2
(45) Date of Patent: Dec. 5, 2006

(54) WOOD GASIFICATION APPARATUS

(75) Inventors: David Nixon Smith, Appleton, WA (US); Allen Rice Ferrell, White Salmon, WA (US)

(73) Assignee: Biogas Technologies, Inc., Lynnwood, WA (US)

( * ) Notice: Subject to any disclaimer, the term of this patent is extended or adjusted under 35 U.S.C. 154(b) by 0 days.

(21) Appl. No.: 10/884,336

(22) Filed: Jul. 1, 2004

(65) Prior Publication Data

US 2006/0000701 A1 Jan. 5, 2006

(51) Int. Cl.
*B01J 19/00* (2006.01)

(52) U.S. Cl. ...................... 422/224; 422/244; 422/309; 202/118; 202/226

(58) Field of Classification Search ............... 201/3, 201/25, 32; 202/118, 226; 585/241; 588/8; 422/224, 309, 244
See application file for complete search history.

(56) References Cited

U.S. PATENT DOCUMENTS

| | | | | |
|---|---|---|---|---|
| 3,458,321 A | * | 7/1969 | Stephenson et al. | 426/448 |
| 4,002,587 A | * | 1/1977 | Watanabe et al. | 264/29.4 |
| 4,038,152 A | * | 7/1977 | Atkins | 201/2.5 |
| 4,685,443 A | * | 8/1987 | McMurtry | 126/247 |
| 4,705,603 A | * | 11/1987 | McMullen et al. | 202/109 |
| 4,759,300 A | * | 7/1988 | Hansen et al. | 110/229 |
| 4,772,430 A | * | 9/1988 | Sauda et al. | 588/8 |
| 5,500,172 A | * | 3/1996 | Derezinski et al. | 264/68 |
| 5,705,035 A | * | 1/1998 | Avetisian et al. | 201/3 |
| 5,720,232 A | * | 2/1998 | Meador | 110/346 |
| 5,993,751 A | * | 11/1999 | Moriarty et al. | 422/233 |
| 6,398,921 B1 | * | 6/2002 | Moraski | 204/157.43 |
| 6,736,940 B1 | * | 5/2004 | Masemore et al. | 201/25 |
| 6,860,257 B1 | * | 3/2005 | Wood | 123/698 |
| 2004/0200428 A1 | * | 10/2004 | Wood | 119/442 |

* cited by examiner

*Primary Examiner*—N. Bhat
(74) *Attorney, Agent, or Firm*—Glenn C. Brown, P.C.

(57) ABSTRACT

A wood gasification apparatus in which cellulosic material is transported by an auger through a housing and heated to vaporize at least a portion of the cellulosic material by frictional heating. The auger and housing define a spiral void through which the cellulosic material is propelled from the inlet to the outlet, and which continually decreases in volume from the inlet to the outlet. The ever decreasing volume of the void increases the pressure on the cellulosic material and maximizes the frictional heating until the material reaches a vaporization temperature.

26 Claims, 3 Drawing Sheets

WOOD GASIFICATION APPARATUS

BACKGROUND OF THE INVENTION

This invention relates to wood gasification, and in particular to a continuous wood gasification apparatus.

FIELD OF THE INVENTION

The gasification of wood can be generally described as the heating of wood to converts the cellulosic material into a combination of combustible fuel gases that typically contains methane, hydrogen, and carbon monoxide. A commercially viable process for the gasification of wood has so far eluded those working in the field. Were such a process to be achieved, numerous applications would be immediately available. One application would be the use of wood waste by sawmills and other wood processing facilities to generate heat and electricity for plant operations.

Most efforts at wood gasification center around large, countercurrent heat exchangers that combust a portion of the wood waste to generate a hot combustion gas stream. The hot combustion gas stream is then contacted with a packed bed of wood chips at a sufficient rate to heat the wood chips under non-oxidizing conditions to a temperature that is sufficient to "crack" the lignins and other cellulosic components of the wood chips into volatile, combustible gases. To date, none of the efforts to commercialize this type of process has been widely adopted in part because of the large capital investment required for such a system, and in part because of remaining technical difficulties in achieving sufficiently precise process control.

Therefore a need remains for a simple, economical apparatus that can reliably and efficiently convert wood to fuel gas.

SUMMARY OF THE INVENTION

This invention is directed to an apparatus that reliably and efficiently converts particulate materials into vapor. In one preferred embodiment, the particulate material is wood that is converted into combustible fuel gases.

The invention is embodied in an apparatus that includes a housing having an inlet and an outlet. A rotatable auger is mounted in the housing, and includes surfaces defining at least one spiral channel. The spiral channel is tapered from a first depth adjacent the housing inlet and to a second, lesser depth adjacent the housing outlet. The auger is rotatable to propel particulate materials from the housing inlet toward the housing outlet. As the particulate materials are moved along the auger they are frictionally heated to a first temperature sufficient to remove moisture from the particulate material. The auger and the housing define a second region wherein the particulate material is frictionally heated to a second temperature sufficient to convert at least a portion of the particulate material to a gas. In one embodiment, as the particulate material is frictionally heated and propelled along the auger, it reaches a plasticizing temperature, and forms a seal between the auger and the housing. The seal prevents gas from flowing back along the auger to the housing inlet, and reduces the possibility that combustible gas could escape from the housing inlet.

In another embodiment of the invention a pair of housing/auger assemblies as generally described above are operated in series. The first assembly heats material to a drying temperature; the second assembly further heats the material to a temperature where it is converted to a gas. This embodiment can be useful where sufficient material is being dried so that a high flow of water vapor is flowing out through the housing inlet. The high flow rate of water vapor out through the inlet can in some instances hinder the flow of particulate material into the housing.

This embodiment includes a first housing having an inlet and an outlet. A first rotatable auger is mounted in the housing, and includes surfaces defining a first spiral channel. The first auger is rotatable to propel particulate material toward the first housing outlet to frictionally heat the particulate materials to a temperature sufficient to dry the material. The heated dried material is then discharged into the inlet of a second assembly. The second assembly includes a second housing having an inlet and an outlet.

A second rotatable auger is mounted in the second housing and also includes surfaces defining a second spiral channel. The second auger is rotatable to propel particulate materials toward the second housing outlet to frictionally heat the particulate materials to a second temperature at which the material is converted into a gas. The first and second auger/housing assemblies of this embodiment are otherwise similar to the first preferred embodiment described above.

These and other features of the invention will now be described with reference to the drawings.

DETAILED DESCRIPTION OF THE PREFERRED EMBODIMENT

Figure 1:
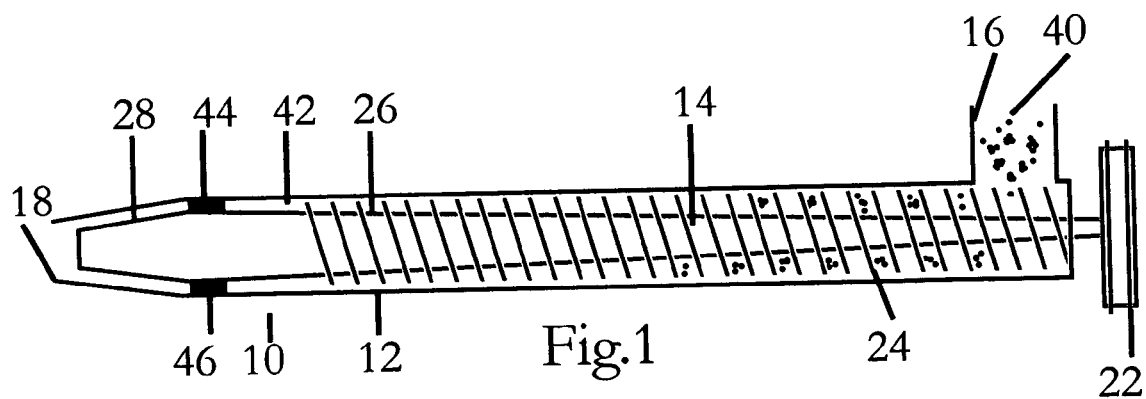
FIG. 1 is cross sectional side view of a first preferred embodiment of the invention.
Figure 2:
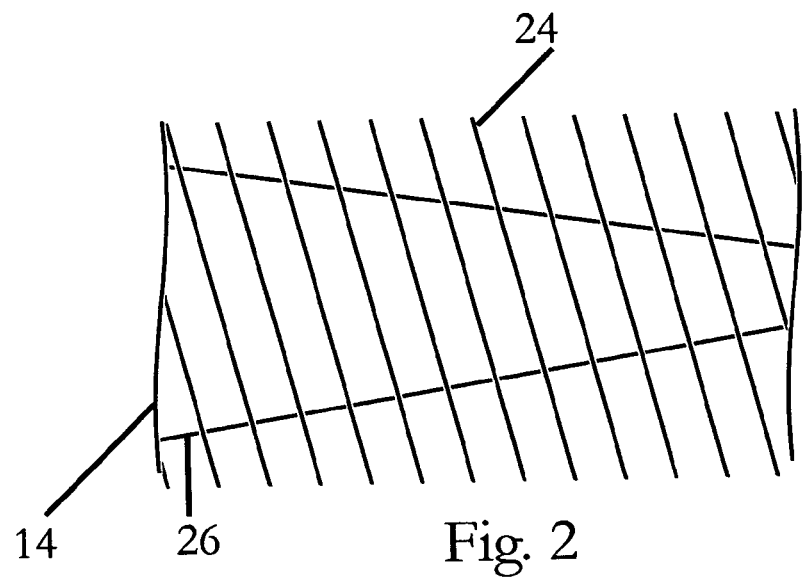
FIG. 2 is a side elevational view of the auger as shown in FIG. 1.
Figure 3:
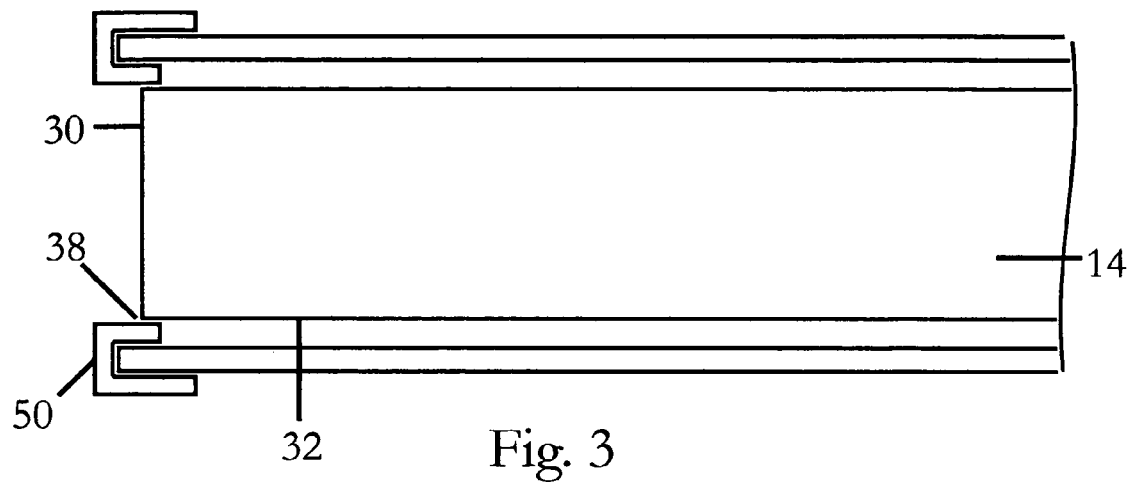
FIG. 3 is an enlarged partial cross-sectional view of the embodiment shown in FIG. 1, and showing the housing outlet in greater detail.
Figure 4:
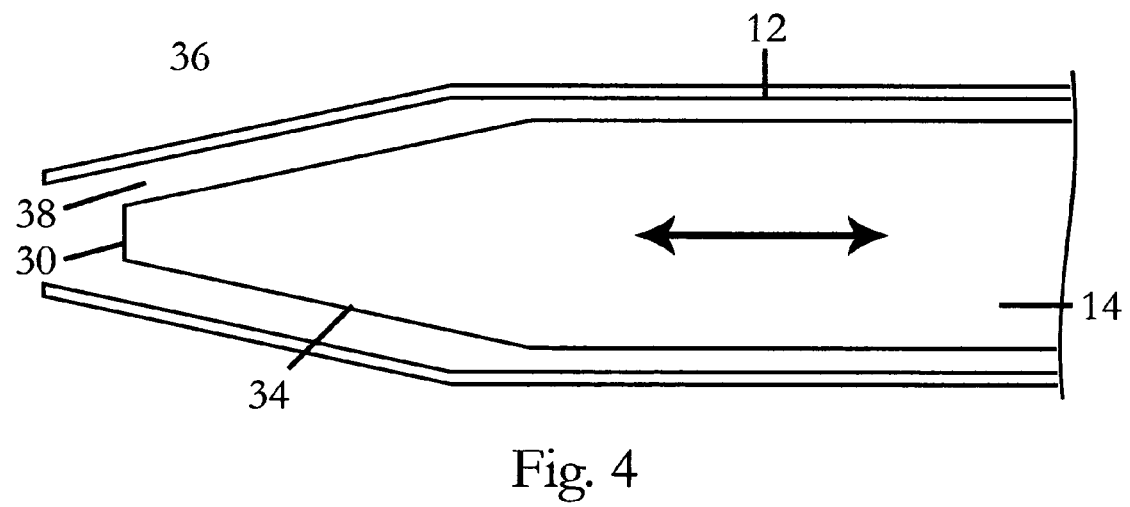
FIG. 4 is an enlarged partial cross-sectional view of the embodiment shown in FIG. 1, and showing the an alternative housing outlet in greater detail.

Turning now to FIG. 1, the a preferred embodiment of the invention is shown generally at 10, and includes a housing 12 and an auger 14. Housing 12 includes an inlet 16 and an outlet 18 spaced apart along bore 20. Auger 14 is driven by motor (not shown) and a belt and sheave assembly 22. Auger 14 includes a continual spiral blade 24 that propels materials through housing 12 as auger 14 is rotated. The spiral blade 24 defines a continually tapering spiral channel 26 which completely tapers to a flat surface 28. Auger 14 includes end portion 30 that includes a flat surface 32, and in one embodiment a tapered portion 34. Tapered auger portion 34 is sized and shaped to fit closely in tapered portion 36 of housing 12, defining an annular discharge opening 38. The clearance between tapered auger portion 34 and tapered housing portion 36 is ideally maintained at about 0.010". In one preferred embodiment (FIG. 4) the clearance can be varied by adjusting the axial position of auger 14 in housing 12. In another preferred embodiment, the clearance is set by means of an annular bushing 50 that is mounted on the outlet end of the housing.

In one preferred embodiment, the apparatus functions to receive wood particles 40 into inlet 16. The wood particles 40 are transported through housing 12 by rotating auger 14, all the while being further compressed by the combined action auger 14 and the ever shrinking volume of spiral channel 26. As the wood particles are compressed, they are heated by the friction between the wood particles and the housing and auger surfaces. In a preferred embodiment the heating of the wood particles is achieved entirely by the frictional heating of the wood particles, although in other embodiments the wood particles might be partially preheated, one or more parts of the apparatus could be heated as well, or an external heat source could be provided.

As the wood particles are transported along auger 14, they are continually heated by the increasing frictional forces and by the pressure applied to the wood particles by the decreasing volume of the spiral channel. At point 42, which is shown schematically in FIG. 1, the wood particles reach a temperature sufficient to drive off free moisture, most of which escapes through outlet 18. As the wood particles are further heated, they reach a temperature at point 44, again indicated schematically, at which they transition into a plastic state. Once at a temperature high enough to become plastic, it is believed that the wood particles "mold" themselves to closely conform to the interior surfaces of the the housing and the auger, and form a substantially gas-tight seal 46 that prevents the flow of gases from the downstream side of seal 46 back toward the housing inlet 14. In the meantime, the auger 14 continues to rotate and to frictionally heat the wood. The wood is heated until it reaches a temperature at which the solid wood is transformed into a combustible vapor containing various gases containing carbon, hydrogen, nitrogen, oxygen, and perhaps even sulfur in small amounts. In one preferred method of operation, the wood particle feed rate, the auger speed, and the annular clearance at the outlet of the housing are selected to provide a slight pressurization of the region in the housing between seal 46 and outlet 14 to provide a velocity to the stream of combustible gas exiting the apparatus. The slight pressurization is achieved in part by the sealing action of seal 46 as described above.

The precise composition of the combustible vapor is not critical to the invention, and will likely vary according to the particular wood material provided to the apparatus. One advantage of the invention is that it can be fed any variety of wood or other cellulosic materials without the need to vary any parameter except perhaps the rpm's at which the auger is driven. Applicant has found that in one preferred embodiment, an auger of about 2" overall diameter rotated at about 1800 rpm's in a housing having an inner diameter of about 2.25" operated satisfactorily to completely convert primarily Douglas fir wood particles into a combustible vapor. In some instances a small amount of fine particulate is expelled in the stream of combustible vapor, but normally the wood particles are essentially completely converted to vapor by the apparatus. This represents a significant advance over the prior art in that most known wood gasification methods involve large wit operations and expensive capital equipment such as large heat exchangers to provide any hope of efficient operation. In addition, the hope of efficient operation provided by known large scale wood gasification processes has not yet been achieved due to inherent difficulties in reliably operating the process. Applicants' invention on the other hand, is very simple, portable, and easily scalable either by increasing the size of the apparatus or by operating multiple units in parallel. In addition, test operation so far has indicated very low wear rates in the auger and the reliable operation of the housing, adding to the economic and reliable operation of the apparatus.

The combustible gases exiting the housing outlet 18 can be ignited directly at outlet 18, which in effect becomes a dynamic nozzle. In this embodiment, the housing is mounted to the fire box of an industrial boiler for example. This method of operation is particularly attractive since the combustible gases do not need to be further treated, purified or stored. In other embodiments the combustible gases exiting the apparatus are collected and stored for use as needed.

Figure 5:
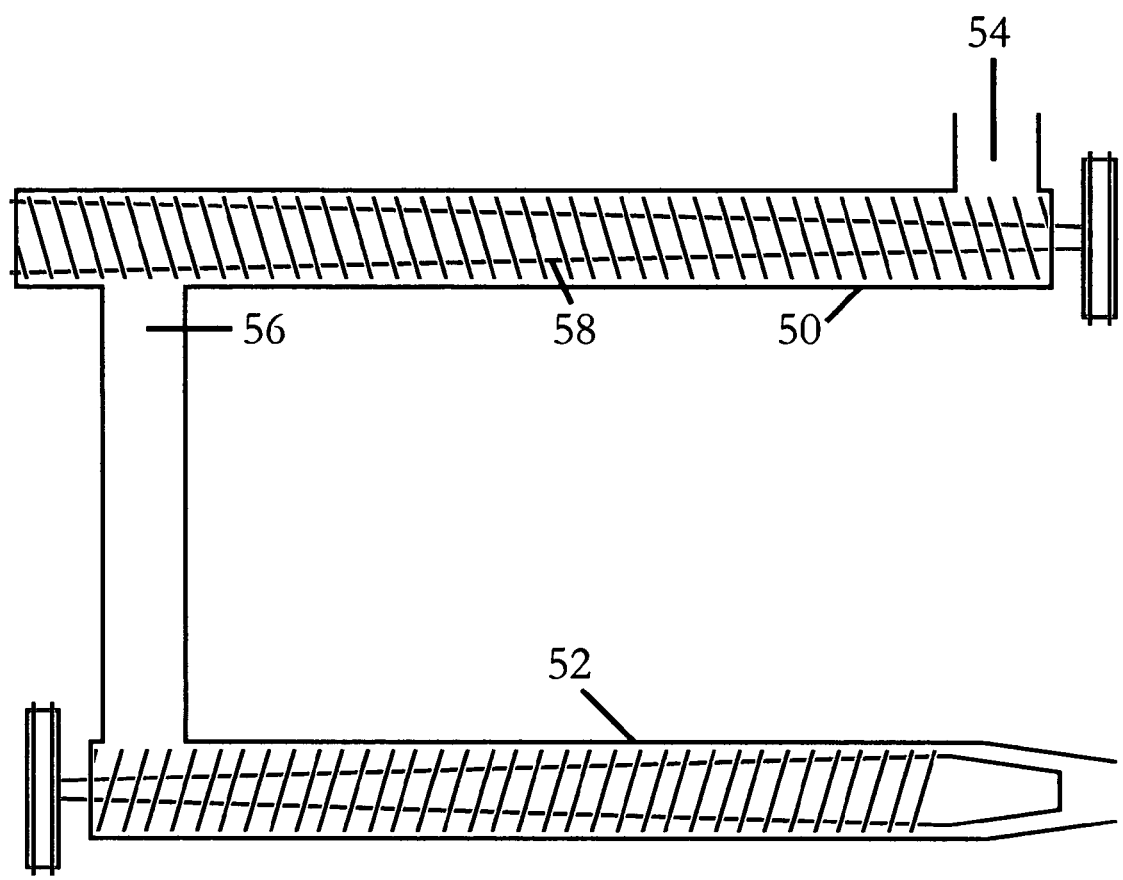
FIG. 5 is a cross sectional side view of a second embodiment of the invention in which includes two auger assemblies.

Another preferred embodiment is shown in FIG. 5, and includes a first auger assembly 50, and a second auger assembly 52. Each auger assembly operates generally as described, with the drying and gasification of the wood particles taking place primarily in first auger assembly 50. The partially heated and dried wood particles are then fed into second auger assembly 52 where they are further heated and converted to combustible vapors. Referring to FIG. 5, wood particles are fed into inlet 54 of first auger assembly 50, and driven toward outlet 56 by auger 58. Auger 58 is as described above and includes a tapered spiral channel that compresses the wood particles as they progress through the housing. The frictional forces and pressure applied to the particles heats them as described above. In this embodiment, the heating of the particles to drive off moisture occurs in the first auger assembly. The particles are further heated in the second auger assembly first to a plastic state as described above, and then to a temperature that vaporizes the particles.

While the invention has been described by the foregoing description of certain preferred embodiments, those of skill in the arts will appreciate that numerous modifications can be made without departing from the scope of the following claims.

What is claimed is:

1. An apparatus for converting particulate materials into a gas comprising:
   a housing having an inlet and an outlet;
   a rotatable auger mounted in the housing, the auger having surfaces defining at least one spiral channel, the spiral channel being tapered from a first depth adjacent the housing inlet and to a second, lesser depth adjacent the housing outlet;
   the auger rotatable to propel particulate materials from the housing inlet toward the housing outlet and adapted to frictionally heat the particulate material to a first temperature sufficient to convert at least a portion of the particulate material into a gas without the need for heat from an external source and, a gas collector connected to the housing outlet.

2. An apparatus according to claim 1 further comprising the auger and the housing defining a first region wherein the particulate material is frictionally heated to the first temperature.

3. An apparatus according to claim 2 therein the first region is in communication with the housing outlet.

4. An apparatus according to claim 3 wherein the first region is an annular space between the auger and the housing.

5. An apparatus according to claim 1 further comprising the auger and the housing defining a second region wherein the particulate material as frictionally heated to a second temperature sufficient to remove moisture from the particulate material without the need for additional heat from an external source.

6. An apparatus according to claim 1 further comprising the second region in communication with the housing inlet.

7. An apparatus according to claim 1 further comprising the annular space between the auger and the housing being tapered from a first cross-sectional area to a second smaller cross-sectional area.

8. An apparatus according to claim 1 wherein the gas is a combustible gas.

9. An apparatus according to claim 1 wherein the particulate material is a cellulosic material.

10. An apparatus according to claim 1 wherein the cellulosic material comprises wood.

11. An apparatus for converting particulate materials to a gas comprising:
- a first housing having an inlet and an outlet;
- a first rotatable auger mounted in the housing, the first auger having surfaces defining a first spiral channel;
- the first auger rotatable to propel particulate material toward the first housing outlet to frictionally heat the particulate materials to a first temperature;
- a second housing having an inlet and an outlet, the second inlet in communication with the first housing first outlet;
- a second rotatable auger mounted in the second housing, the second auger having surfaces defining a second spiral channel;
- the second auger rotatable to propel particulate materials toward the second housing outlet to frictionally heat the particulate materials to a second temperature sufficient to convert at least a portion of the particulate material into a gas without the need for heat from an external source and, a gas collector connected to the second housing outlet.

12. An apparatus according to claim 11 further comprising the first auger and the first housing defining a first region wherein the particulate material as frictionally heated to the first temperature sufficient to remove moisture from the particulate material.

13. An apparatus according to claim 12 wherein the first region is in communication with the first housing outlet.

14. An apparatus according to claim 12 wherein the first region is a rust annular space between the first auger and the first housing.

15. An apparatus according to claim 11 further comprising the first spiral channel being tapered from a first depth adjacent the first housing inlet and to a second, lesser depth adjacent the first housing outlet.

16. An apparatus according to claim 11 further comprising the second auger and the second housing defining a second region wherein the particulate material is frictionally heated to the second temperature sufficient to convert at least a portion of the particulate material to a gas.

17. An apparatus according to claim 12 wherein the second region is in communication with the second housing outlet.

18. An apparatus according to claim 12 wherein the second region is a second annular space between the second auger and the second housing.

19. An apparatus according to claim 11 further comprising the second annular space being tapered from a first cross-sectional area to a second smaller cross-sectional area.

20. An apparatus according to claim 11 wherein the gas is a combustible gas.

21. An apparatus according to claim 11 wherein the particulate material is a cellulosic material.

22. An apparatus according to claim 11 wherein the cellulosic material comprises wood.

23. An apparatus according to claim 11 wherein the second housing inlet is positioned to receive particulate material from the first housing outlet.

24. An apparatus according to claim 12 wherein the first region is isolated from the housing inlet.

25. An apparatus according to claim 24 wherein the first region is isolated from the housing inlet by a seal formed of particulate material that has been heated to a plasticizing temperature.

26. An apparatus according to claim 25 wherein the seal is an annular seal of plasticized material in sealing engagement with the housing and the auger.

* * * * *